United States Patent
Kakishima et al.

(10) Patent No.: US 12,167,355 B2
(45) Date of Patent: Dec. 10, 2024

(54) TERMINAL AND COMMUNICATION METHOD FOR PERFORMING DOPPLER ESTIMATION

(71) Applicant: NTT DOCOMO, INC., Tokyo (JP)

(72) Inventors: Yuichi Kakishima, Tokyo (JP); Yuki Matsumura, Tokyo (JP); Syouichi Higuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 277 days.

(21) Appl. No.: 17/755,472

(22) PCT Filed: Nov. 7, 2019

(86) PCT No.: PCT/JP2019/043774
§ 371 (c)(1),
(2) Date: Apr. 29, 2022

(87) PCT Pub. No.: WO2021/090460
PCT Pub. Date: May 14, 2021

(65) Prior Publication Data
US 2022/0400456 A1    Dec. 15, 2022

(51) Int. Cl.
*H04W 56/00*    (2009.01)
*H04L 5/00*    (2006.01)

(52) U.S. Cl.
CPC ......... *H04W 56/004* (2013.01); *H04L 5/0048* (2013.01); *H04L 5/0078* (2013.01)

(58) Field of Classification Search
CPC .. H04W 56/004; H04L 5/0048; H04L 5/0078; H04L 25/0222; H04L 27/261; H04L 27/2657; H04L 27/2675; H04L 5/0094; H04B 7/01; Y02D 30/70
See application file for complete search history.

(56) References Cited

U.S. PATENT DOCUMENTS

| | | | |
|---|---|---|---|
| 2017/0311188 A1 | 10/2017 | Sun et al. | |
| 2018/0212732 A1* | 7/2018 | You | H04L 5/0051 |
| 2018/0287750 A1* | 10/2018 | Abdoli | H04W 72/23 |
| 2019/0089436 A1* | 3/2019 | Wei | H04L 1/16 |

(Continued)

FOREIGN PATENT DOCUMENTS

| WO | 2015/153173 A1 | 10/2015 |
|---|---|---|
| WO | 2018/202088 A1 | 11/2018 |

OTHER PUBLICATIONS

Extended European Search Report issued in counterpart European Application No. 19951336.7 mailed on Jun. 16, 2023 (11 pages).

(Continued)

*Primary Examiner* — Ian N Moore
*Assistant Examiner* — Latresa A McCallum
(74) *Attorney, Agent, or Firm* — Osha Bergman Watanabe & Burton LLP

(57) ABSTRACT

A terminal includes a receiving unit configured to receive information relating to an arrangement of a tracking reference signal and a plurality of tracking reference signals based on the information relating to the arrangement of the tracking reference signal, and a controller configured to perform a Doppler estimation using two of the plurality of tracking reference signals, wherein an interval between the two of the plurality of tracking reference signals in a time domain is variable.

5 Claims, 13 Drawing Sheets

(56) References Cited

U.S. PATENT DOCUMENTS

2019/0109750 A1     4/2019  Nam et al.
2021/0044401 A1*    2/2021  Yoon ..................... H04B 7/088

OTHER PUBLICATIONS

MediaTek Inc.; "On TRS design and remaining issues"; 3GPP TSG-RAN WG1 Meeting Ad-hoc#3, R1-1716229; Nagona, Japan; Sep. 18-21, 2017 (14 pages).

MediaTek Inc.; "On TRS design"; 3GPP TSG-RAN WG1 Meeting #90, R1-1713713; Prague, Czech Republic; Aug. 21-25, 2017 (14 pages).

3GPP TS 38.300 V15.7.0; "3rd Generation Partnership Project; Technical Specification Group Radio Access Network; NR; NR and NG-RAN Overall Description; Stage 2 (Release 15)"; Sep. 2019 (99 pages).

3GPP TS 38.213 V15.7.0; "3rd Generation Partnership Project; Technical Specification Group Radio Access Network; NR; Physical layer procedures for control (Release 15)"; Sep. 2019 (108 pages).

International Search Report for corresponding International Application No. PCT/JP2019/043774, mailed Jul. 7, 2020 (5 pages).

Written Opinion for corresponding International Application No. PCT/JP2019/043774, mailed Jul. 7, 2020 (4 pages).

\* cited by examiner

TERMINAL AND COMMUNICATION METHOD FOR PERFORMING DOPPLER ESTIMATION

TECHNICAL FIELD

The present invention relates to a terminal and a communication method in a wireless communication system.

BACKGROUND ART

In NR (New Radio) (also referred to as "5G") that is a successor system to LTE (Long Term Evolution), technologies are discussed that satisfy requirements of high capacity systems, high data transmission rates, low delays, simultaneous connections of multiple terminals, low costs, power saving, and the like (for example, Non-Patent Document 1).

In NR, TRS (Tracking reference signal) is introduced that is used for tracking the time domain and the frequency domain (for example, Non-Patent Document 2). On the other hand, in NR, a scenario is being discussed in which high speed mobility environments such as HRT (High speed train) are assumed.

PRIOR ART DOCUMENTS

Non-Patent Documents

Non Patent Document 1: 3GPP TS 38.300 V15.7.0 (2019-09)
Non Patent Document 2: 3GPP TR 38.213 V15.7.0 (2019-09)

SUMMARY OF THE INVENTION

Problem to be Solved by the Invention

For example, in a scenario in which the maximum travel speed is 500 km/h, the Doppler fluctuation is very large. Therefore, the Doppler estimation may be hindered by the configuration of the reference signal such as the conventional TRS, and the reception error rate may be excessively high.

The present invention is made in view of the foregoing matter, and the present invention is intended to provide a reference signal in a wireless communication system suitable for Doppler estimation.

Means for Solving the Problem

According to the disclosed technique, a terminal is provided that includes a receiving unit configured to receive information relating to an arrangement of a tracking reference signal and a plurality of tracking reference signals based on the information relating to the arrangement of the tracking reference signal, and a controller configured to perform a Doppler estimation using two of the plurality of tracking reference signals, wherein an interval between the two of the plurality of tracking reference signals in a time domain is variable.

Effect of the Invention

According to the disclosed technique, in a wireless communication system, a reference signal suitable for Doppler estimation can be provided.

EMBODIMENTS FOR CARRYING OUT THE INVENTION

Hereinafter, embodiments of the present invention will be described with reference to the drawings. The embodiments described below are examples, and the embodiments to which the present invention is applied are not limited to the following embodiments.

In operations of a wireless communication system according to an embodiment of the present invention, conventional techniques are appropriately used. The conventional technique may be, for example, a conventional LTE, but is not limited to a conventional LTE. The term "LTE" used herein has a broad meaning, including LTE-Advanced and a scheme after LTE-Advanced (for example, NR), unless particularly indicated.

Embodiments of the present invention described below use the terms SS (Synchronization Signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), and the like used in conventional LTEs. This is for convenience of reference, and similar signals, functions, and the like may be referred to as other names. The above terms in NR correspond to NR-SS, NR-PSS, NR-SSS, NR-PBCH, NR-PRACH, and the like. However, even the signal used for NR is not necessarily specified as "NR-."

In the embodiments of the present invention, the duplex method may be a TDD (Time Division Duplex) method, an FDD (Frequency Division Duplex) method, or any other method (for example, Flexible Duplex and the like).

Further, in the embodiments of the present invention, that a wireless parameter and the like is "configured" means that a predetermined value may be preliminarily set (Pre-configured) or that a wireless parameter indicated by a base station 10 or a terminal 20 may be set.

Figure 1:
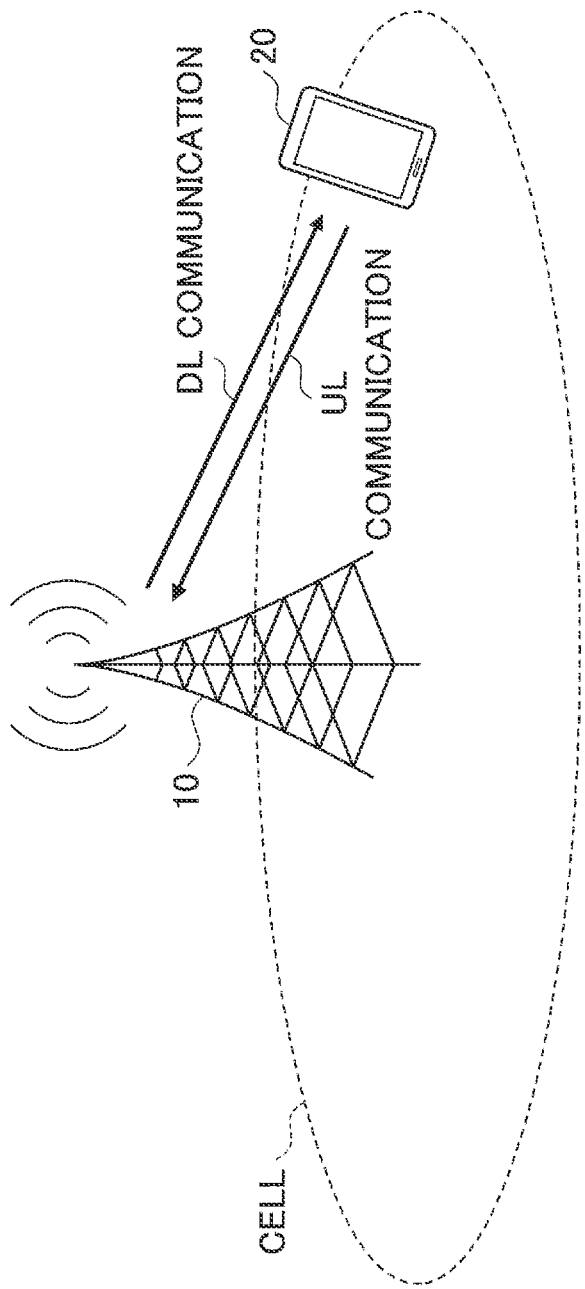
FIG. 1 is a diagram illustrating an example of a configuration of a wireless communication system according to an embodiment of the present invention.

FIG. 1 is a diagram illustrating a wireless communication system according to an embodiment of the present invention. The wireless communication system in an embodiment of the present invention includes a base station 10 and a terminal 20, as shown in FIG. 1. In FIG. 1, one base station 10 and one terminal 20 are shown, but this is an example and there may be each more than one.

The base station 10 is a communication device that provides one or more cells and performs wireless communication with the terminal 20. The physical resource of a radio signal is defined by a time domain and a frequency domain, the time domain may be defined by a number of OFDM symbols, and the frequency domain may be defined by a number of sub-carriers or a number of resource blocks. The base station 10 transmits synchronization signals and system information to the terminal 20. The synchronization signals are, for example, NR-PSS and NR-SSS. System information is transmitted, for example, by NR-PBCH and is also referred to as indication information. As shown in FIG. 1, the base station 10 transmits a control signal or data to the terminal 20 by DL (Downlink) and receives a control signal or data by UL (Uplink) from the terminal 20. Both the base station 10 and the terminal 20 can transmit and receive signals using beam forming. Both the base station 10 and the terminal 20 can also apply MIMO (Multiple Input Multiple Output) communications to the DL or UL. Both the base station 10 and the terminal 20 may also communicate via a secondary cell (SCell) and a primary cell (PCell) by CA (Carrier Aggregation). In addition, the terminal 20 may communicate via the primary cell of the base station 10 and a primary secondary cell of another base station 10 by DC (Dual Connectivity).

The terminal 20 is a communication device with a wireless communication function, such as a smartphone, a cellular phone, a tablet, a wearable terminal, and a communication module for M2M (Machine-to-Machine). As shown in FIG. 1, the terminal 20 utilizes various communication services provided by a wireless communication system by receiving control signals or data at DL from the base station 10 and transmitting control signals or data at UL to the base station 10.

Here, the following TRS (Tracking reference signal) is introduced in NR. The TRS is used for tracking the time domain and frequency domain. The TRS may be referenced as a CSI-RS (Channel state information reference signal for tracking) or as a periodic one port CSI-RS with a frequency density of 3.

The TRS may be configured in any of the following forms 1) and 2).
  1) One-slot TRS: Two CSI-RS resources are arranged in one slot and two OFDM symbols are used
  2) Two-slot TRS: Two CSI-RS resources are placed in each of two successive slots, and four CSI-RS resources are used in total The symbols, at which TRSs are arranged, may be separated from each other by four symbols within a slot, and may be multiplexed by time division. The transmit bandwidth in which TRSs are arranged may be either the smaller one of 52 resource blocks and the BWP size, or may be the BWP size. The TRS cycle may be 10 ms, 20 ms, 40 ms, or 80 ms.

Figure 2:
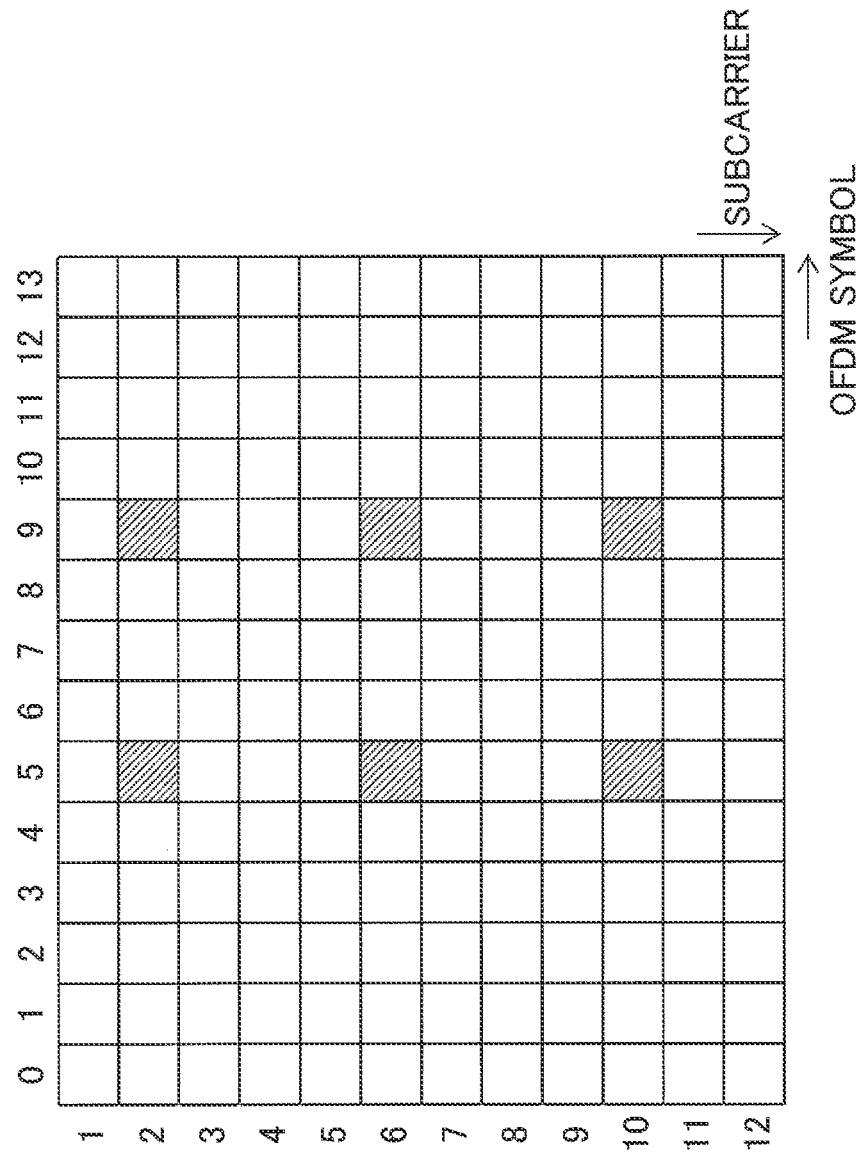
FIG. 2 is a diagram illustrating an example (1) of an arrangement of reference signals.

FIG. 2 is a diagram showing an example (1) of a reference signal arrangement. FIG. 2 is an example of a one-slot TRS arrangement in which TRSs are placed at the OFDM symbol positions {5, 9} within a slot.

Figure 3:
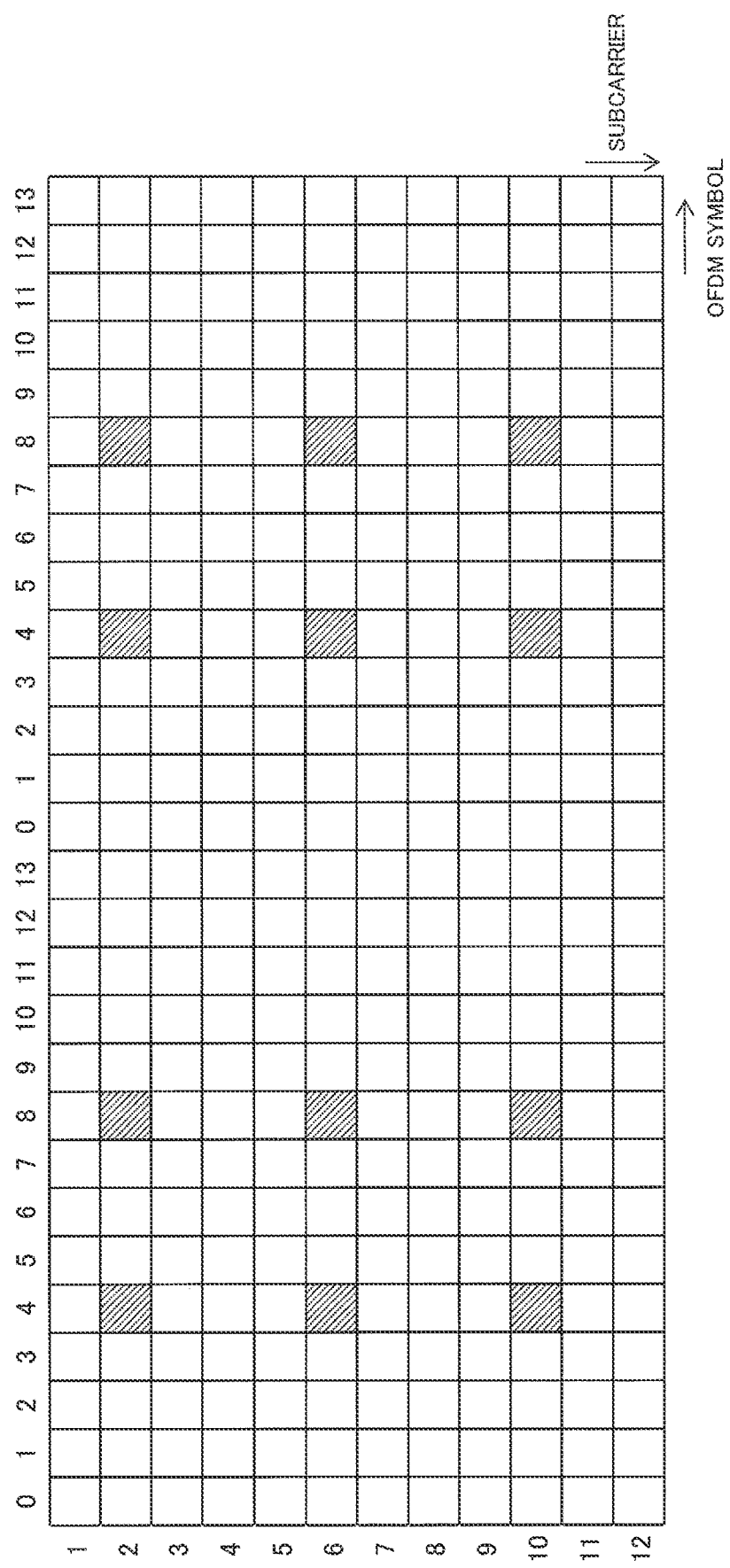
FIG. 3 is a diagram illustrating an example (2) of an arrangement of reference signals.

FIG. 3 is a diagram showing an example (2) of a reference signal arrangement. FIG. 3 is an example of a two-slot TRS arrangement in which TRSs are placed at the OFDM symbol positions {4, 8} in the slots.

Figure 4:
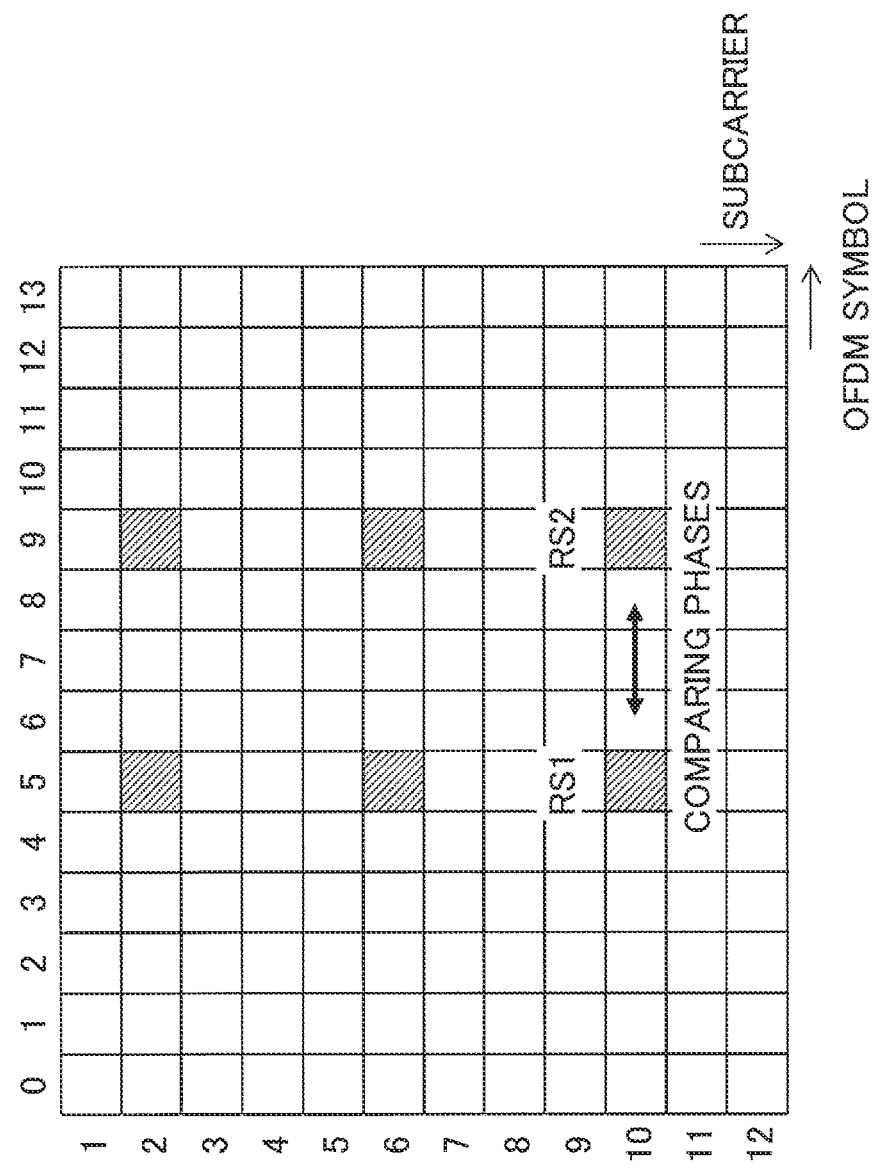
FIG. 4 is a diagram (1) for explaining a Doppler estimation.

FIG. 4 is a diagram (1) for explaining a Doppler estimation. The receiver performs a Doppler estimation based on the reception of two different timing reference signals. As shown in FIG. 4, phases are compared between RS1 disposed at OFDM symbol #5 and RS2 disposed at OFDM symbol #9. If there is no phase difference between the two reference signals, it can be assumed that there is no Doppler fluctuation. On the other hand, when there is a Doppler fluctuation, the Doppler estimation can be made based on the phase rotation observed in the two reference signals.

Figure 5:
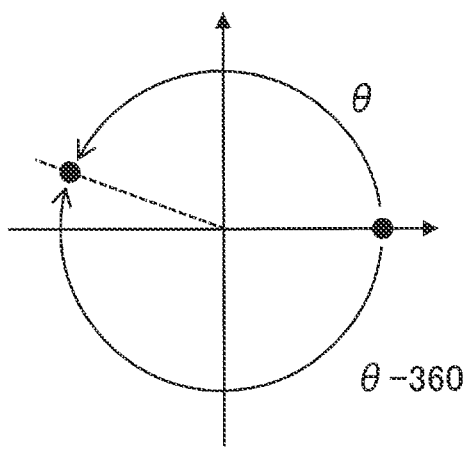
FIG. 5 is a diagram (2) for explaining a Doppler estimation.

FIG. 5 is a diagram (2) for explaining a Doppler estimation. If the time interval between the two reference signals is too large, because the phase rotation becomes too large, the Doppler estimation is difficult to be performed. In particular, in environments where the phase difference exceeds +180 degrees to −180 degrees, the correct phase rotation cannot be measured. For example, in FIG. 5, it is unclear whether the phase rotation is θ, θ+360, θ+360*2, θ+360*3, . . . , θ−360, θ−360*2, θ−360*3, . . . .

Figure 6:
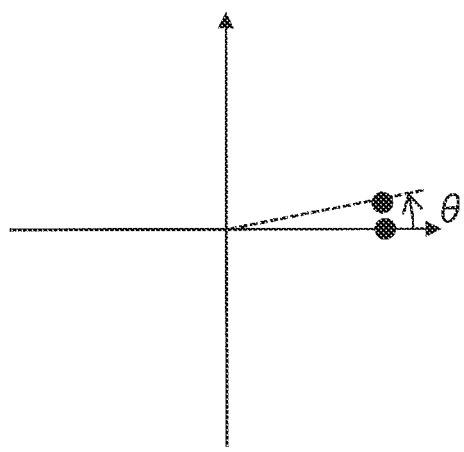
FIG. 6 is a diagram (3) for explaining a Doppler estimation.

FIG. 6 is a diagram (3) for explaining a Doppler estimation. If the time interval between the two reference signals is too small, because the phase rotation θ is small as shown in FIG. 6, the Doppler estimation accuracy decreases in a noise-intensive environment.

Discussions are currently underway on the application of NR to high-speed mobile environments. For example, in a scenario assuming a maximum travel speed of 500 km/h, there is a large Doppler fluctuation, which can interfere with the Doppler estimation in the conventional configuration of reference signals. In addition, in cases where the Doppler frequency fluctuates instantaneously in the high-speed railway environment and the like, the Doppler frequency cannot be tracked.

Figure 7:
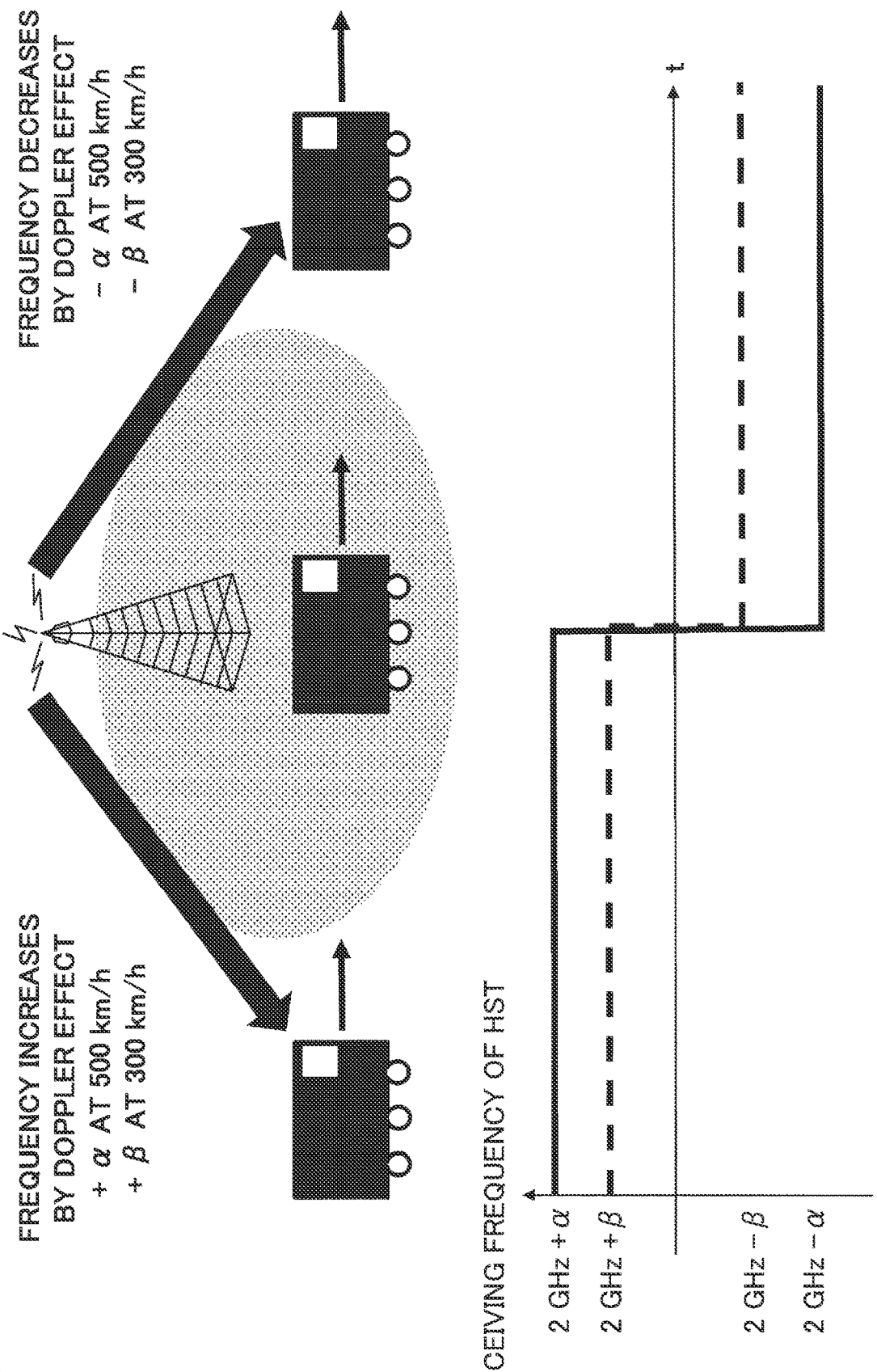
FIG. 7 is a diagram for explaining a case in which Doppler frequency varies.

FIG. 7 is a diagram for explaining a case in which the Doppler frequency varies. As shown in FIG. 7, it is assumed that the high speed train passes near the base station 10.

During the period when the vehicle approaches the base station 10, the transmit frequency of the base station 10 observed in the vehicle is increased due to the Doppler effect. If the transmit frequency of the base station 10 is 2 GHz, for example, the observed frequency will be 2 GHz+α if the vehicle speed is 500 km/h, and will be 2 GHz+β if the vehicle speed is 300 km/h. As shown in FIG. 7, the higher the speed, the greater the Doppler effect, and thus, α>β.

On the other hand, during the period when the vehicle is going away from the base station 10, the transmit frequency of the base station 10 observed in the vehicle is decreased due to the Doppler effect. If the transmission frequency of the base station 10 is 2 GHz, for example, the observed frequency will be 2 GHz−α if the vehicle speed is 500 km/h, and will be 2 GHz−β if the vehicle speed is 300 km/h. As shown in FIG. 7, the higher the speed, the greater the Doppler effect, and thus, α>β.

As shown in FIG. 7, the Doppler frequency fluctuates instantaneously before and after the point at which the vehicle passes near the base station 10. For example, if the vehicle speed is 500 km/h, the frequency of the base station 10 observed in the vehicle will vary from 2 GHz+α to 2 GHz−α, and if the vehicle speed is 300 km/h, it will vary from 2 GHz+β to 2 GHz−β. In other words, it is assumed that the higher the vehicle speed, the greater the frequency fluctuation due to the Doppler effect.

Accordingly, the configuration of the reference signal that enables Doppler tracking is proposed. For example, the configuration of a reference signal is proposed that provides a wide range of Doppler estimation from low speed travel to high speed travel. For example, the configuration of a reference signal that enables to follow a dynamically varying Doppler frequency is proposed.

Figure 8:
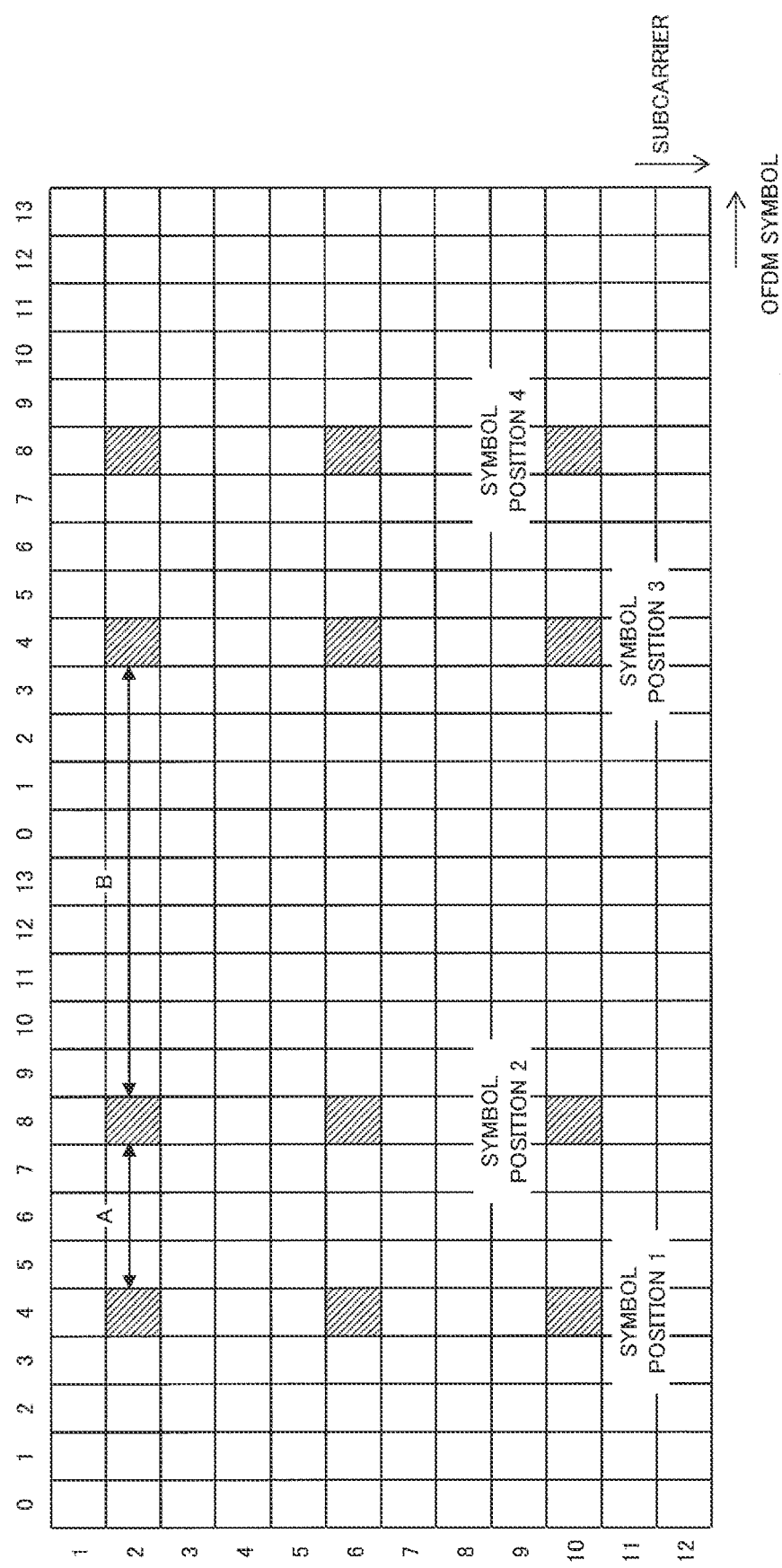
FIG. 8 is a diagram illustrating an example (1) of an arrangement of a reference signal according to an embodiment of the present invention.

FIG. 8 is a diagram showing an example (1) of a reference signal according to an embodiment of the present invention. As shown in FIG. 8, the symbol interval of the two-slot TRS may be changed. Similar techniques may be applied to one-slot TRS or other new TRS configurations.

For example, the symbol interval in the slot shown in FIG. 8 may be changed. For example, the distance A between the symbol position 1 and the symbol position 2 may be changed. For example, the distance A may be any number of symbols as in A={3, 2, 1}. Symbol interval A may be signaled. For example, the conventionally supported four-symbol interval and the newly defined symbol interval may be switched, and the information relating to the switching may be signaled.

For example, the symbol interval across the slots shown in FIG. 8 may be changed. For example, the distance B between the symbol position 2 and the symbol position 3 may be changed. For example, the distance B may be any number of symbols as in B={3, 2, 1}. Symbol interval B may be signaled. For example, symbol positions may be designated independently for each slot, and symbol positions for each slot may be signaled. That is, in FIG. 8, symbol position 1, symbol position 2, symbol position 3, and symbol position 4 may be signaled.

The terminal 20 may perform: the Doppler estimation using the TRS of the symbol position 1 and the TRS of the symbol position 2; the Doppler estimation using the TRS of the symbol position 2 and the TRS of the symbol position 3; the Doppler estimation using the TRS of the symbol position 3 and the TRS of the symbol position 4; or the Doppler estimation using non-consecutive TRS symbols. Terminal 20 may perform a Doppler estimation by combining two or more TRS symbols.

Figure 9:
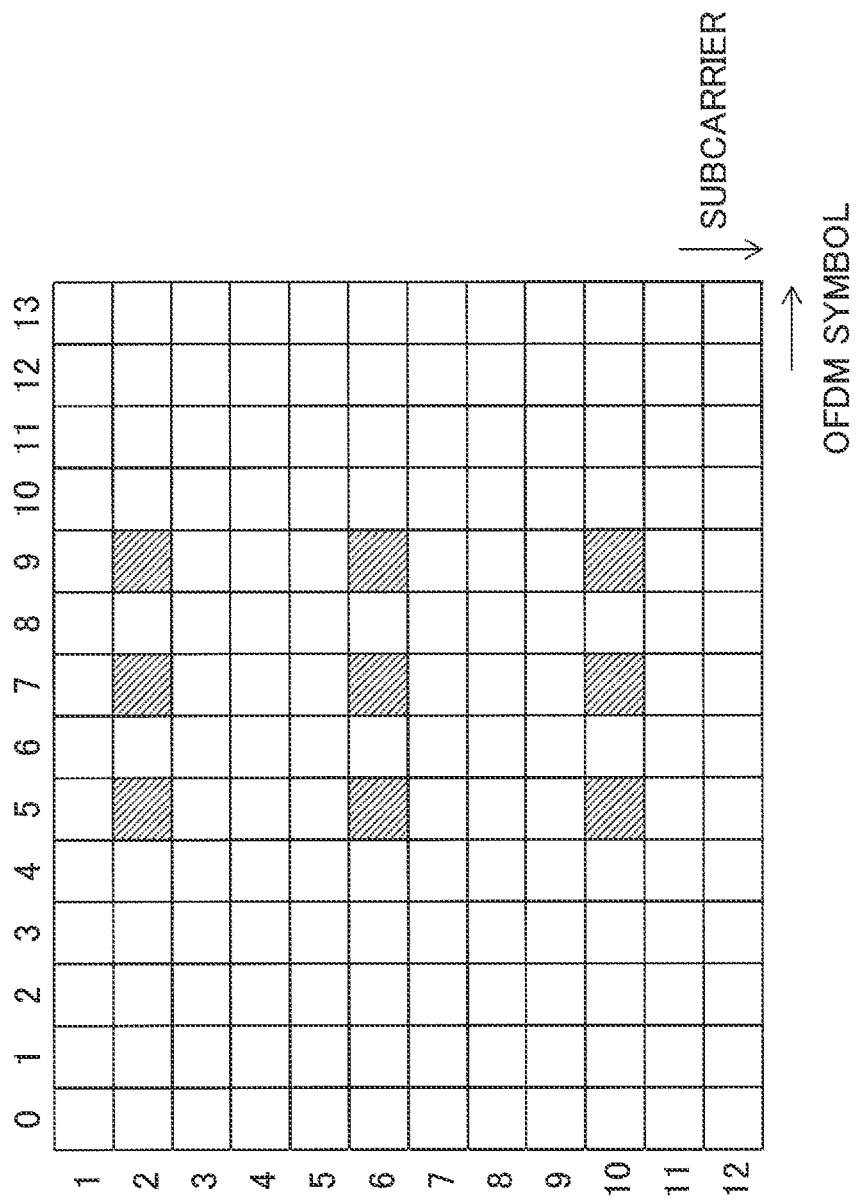
FIG. 9 is a diagram illustrating an example (2) of an arrangement of a reference signal according to an embodiment of the present invention.

FIG. 9 is a diagram showing an example (2) of a reference signal according to an embodiment of the present invention. As shown in FIG. 9, the number of TRS symbols in the slot may be two or more, for example, three. The plurality of TRS symbols may be, or need not be, located across the slots in the two-slot TRS.

For example, the TRS symbol interval may be fixed. For example, the TRS symbol interval may be a value such as 2, 3, 4 or 5. For example, the TRS symbol interval may be variable. For example, the symbol interval or symbol positions of the TRSs may be dynamically specified.

For example, more than two TRS symbol positions may be specified, such as {5, 8, 12}. For example, the network may be able to indicate the number of TRS symbols. For example, a configuration, in which the number of TRS symbols in the slot is three, may be supported by only a single slot TRS.

The terminal 20 may perform the Doppler estimation using the TRS of the symbol #5 shown in FIG. 9 and the TRS of the symbol #7, or may perform the Doppler estimation using the TRS of the symbol #7 and the TRS of the symbol #9.

Figure 10:
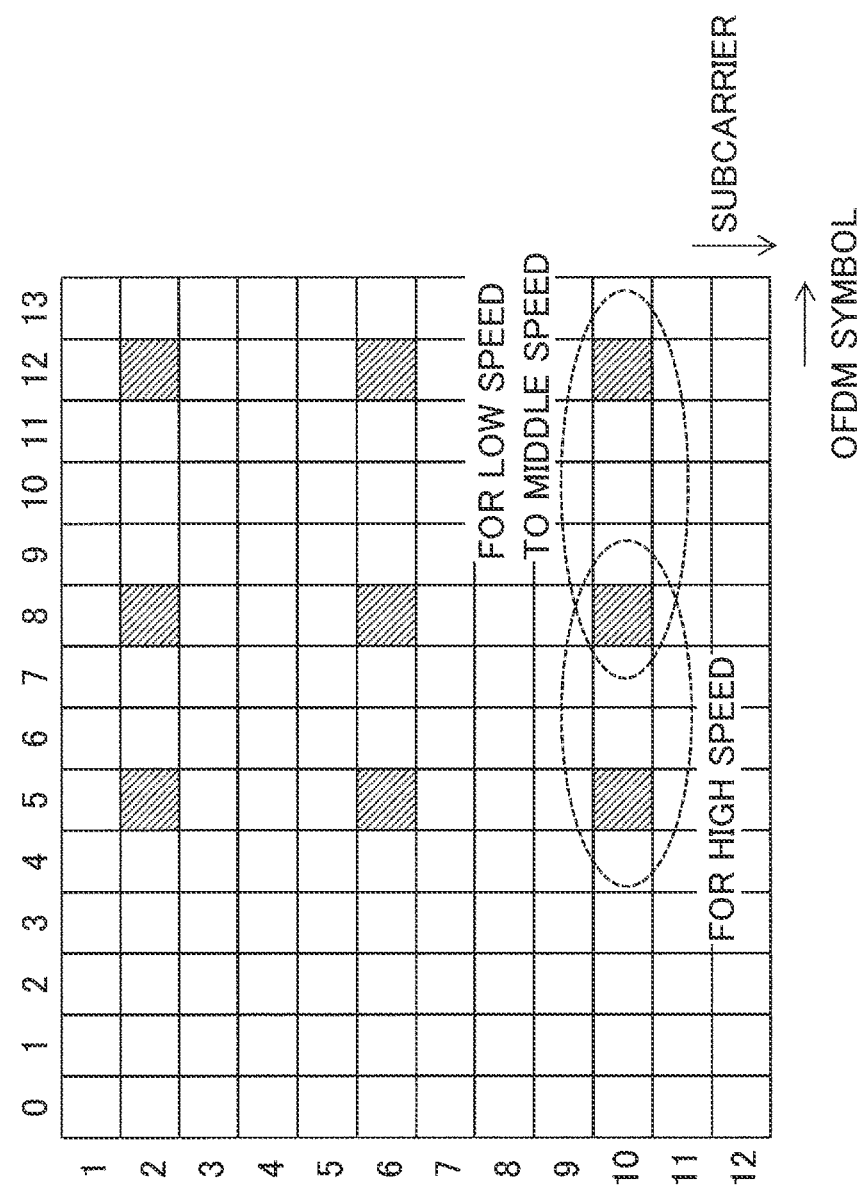
FIG. 10 is a diagram illustrating an example (3) of an arrangement of a reference signal according to an embodiment of the present invention.

FIG. 10 is a diagram showing an example (3) of the arrangement of reference signals according to an embodiment of the present invention. TRS symbols arranged in multiple slots may be equally spaced or unequally spaced.

For example, unequal interval may be assumed to correspond to different Doppler speeds. As shown in FIG. 10, a high speed Doppler estimation may be performed using TRSs with a 3-symbol interval, or a low to medium speed Doppler estimation may be performed using TRSs with a 4-symbol interval. That is, the terminal 20 may perform the high-speed Doppler estimation using the TRS of the symbol #5 and the TRS of the symbol #8 shown in FIG. 10, or the low-speed to medium-speed Doppler estimation using the TRS of the symbol #8 and the TRS of the symbol #12.

For example, the TRS symbol interval within or between slots may vary depending on the frequency. For example, the TRS symbol interval within or between slots may be different for each subcarrier. For example, when FIG. 4 is assumed, the symbol intervals may be 3, 4, and 5, for the sub-carrier numbers 2, 6, and 10, respectively.

The method of indicating the symbol number or slot number relating to the arrangement of the TRS may be signaled as the following a)-c).

a) A start slot number, a start symbol number, a symbol distance within a slot may be indicated, or symbol numbers of two TRS resources may be indicated, as in {4,8}.

For example, a distance A between symbol position 1 shown in FIG. 8 and symbol position 2, or a distance B between symbol position 2 and symbol position 3 shown in FIG. 8 may be signaled by the method of indication.

b) In the two-slot TRS, the distance B between the symbol position 2 and the symbol position 3 shown in FIG. 8 may be indicated by a slot number. That is, the resources in the second slot may be specified to be the same as the first slot, or to be derived from the first slot resources. The distance B between the symbol position 2 and the symbol position 3 shown in FIG. 8 may be indicated by a slot number and a symbol number. That is, the resources in the second slot may be flexibly configured independently from the first slot's resources.

c) Information about the arrangement of the TRS may be dynamically switched by DCI (Downlink Control Information) or may be relatively slowly switched by MAC-CE (Media Access Control-Control Element) or RRC (Radio Resource Control) signaling.

Figure 11:
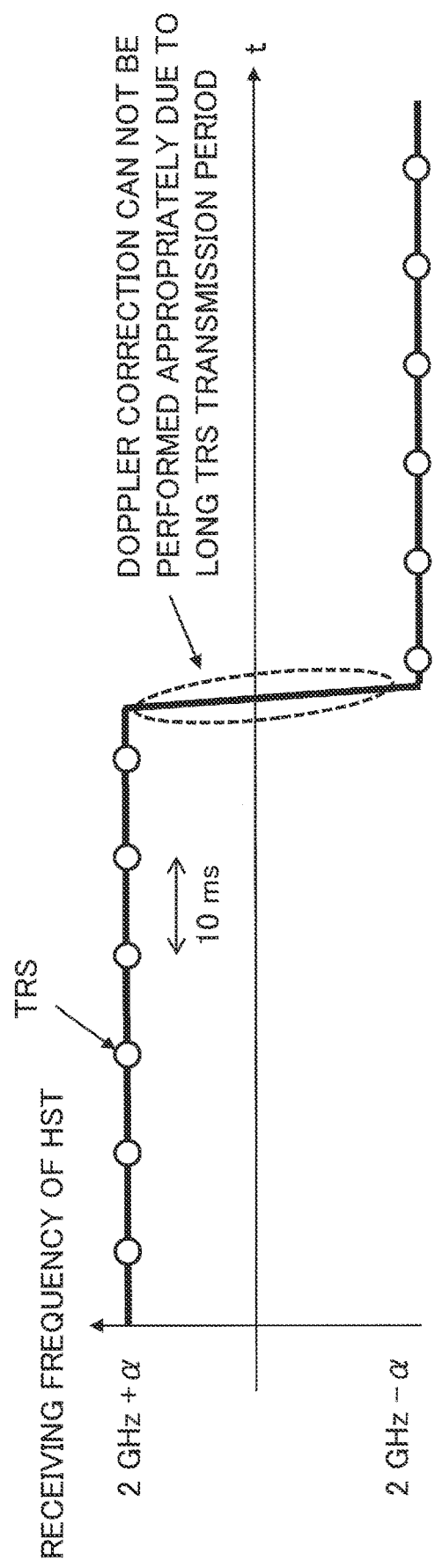
FIG. 11 is a diagram for explaining a relationship between a transmission period of a reference signal and a Doppler estimation.

FIG. 11 is a diagram for explaining a relationship between a transmission period of a reference signal and a Doppler estimation. The current specification allows the TRS transmission cycle to be set to 10 ms, 20 ms, 40 ms, or 80 ms. However, in environments where the Doppler frequency fluctuates instantaneously, it is difficult to follow the Doppler estimation. As shown in FIG. 11, when the transmission period of the TRS is 10 ms, if the Doppler effect occurs as shown in FIG. 7, because the fluctuation of the frequency of the base station 10 observed in the vehicle from 2 GHz+α to 2 GHz−α occurs instantaneously, and the TRS transmission period is long, the Doppler correction cannot be appropriately performed.

Therefore, a transmission period of less than 10 ms may be supported as the TRS transmission period. For example, the TRS transmission period of 1 ms, 2 ms, or 4 ms may be supported. Also, for example, the TRS transmission period of 1, 2, or 4 slots may be supported. The accuracy of Doppler estimation can be improved by shortening the TRS transmission period.

Also, for example, the TRS symbol interval may be limited. For example, the TRS symbol interval to be indicated may be limited to 2, 3, 4 or 5. For example, the limitation may be applied only within a slot. That is, the TRS symbol interval across the slots may be freely configured.

For example, the proposed scope of the TRS arrangement of embodiments of the present invention may be limited to a specific frequency band or frequency range, or limited to a specific SCS (Sub-carrier spacing). For example, it may be limited to FR1 (Frequency Range 1) or SCS=15 kHz or 30 kHz, etc.

For example, signaling of TRS symbol locations may be switched along with other signal or channel configurations. For example, the configuration of DM-RS (Demodulation reference signal) and the TRS symbol positions may be switched simultaneously. For example, switching of the number of additional DM-RSs (Additional DM-RSs) and switching of the TRS symbol positions may be performed simultaneously. For example, the additional DM-RS number may be 3 and the TRS symbol interval may be 3 at high speed. For example, a part or all of: a DM-RS configuration; a TRS configuration; a PT-RS (Phase tracking-Reference signal) configuration; a CSI-RS configuration; and a PDCCH configuration, may be switched together as an RS configuration set.

For example, in a proposal for a TRS configuration in an embodiment of the present invention, the TRS may be replaced with another reference signal. For example, the TRS may be implemented by a downlink DM-RS or downlink PT-RS. For example, the reference signal used for tracking may be switched depending on the TRS multiplexing density or on whether or not the TRS is configured. For example, the reference signal used for tracking may be switched to the PT-RS depending on the TRS multiplexing density or on whether the TRS is configured.

It should be noted that the proposal concerning the TRS arrangement according to the embodiment of the present invention may be implemented by using, as reference signals, uplink DM-RSs, uplink SRSs (Sounding reference signal), uplink PT-RSs, or the like, in place of the TRSs.

A Doppler estimation may be performed using a plurality of types of different reference signals.

Information indicating whether or not the terminal 20 supports the proposed TRS arrangement according to an embodiment of the present invention, or information indicating conditions for supporting the proposal, may be reported as part of UE Capability. For example, the conditions for supporting the proposal may include: the TRS density to be supported; the resource density of the time domain in which the TRS is located; the resource density of the frequency domain in which the TRS is located; the value of the interval A between symbol position 1 and symbol position 2 shown in FIG. 8; or the value of the interval B between symbol position 2 and symbol position 3 shown in FIG. 8.

Figure 12:
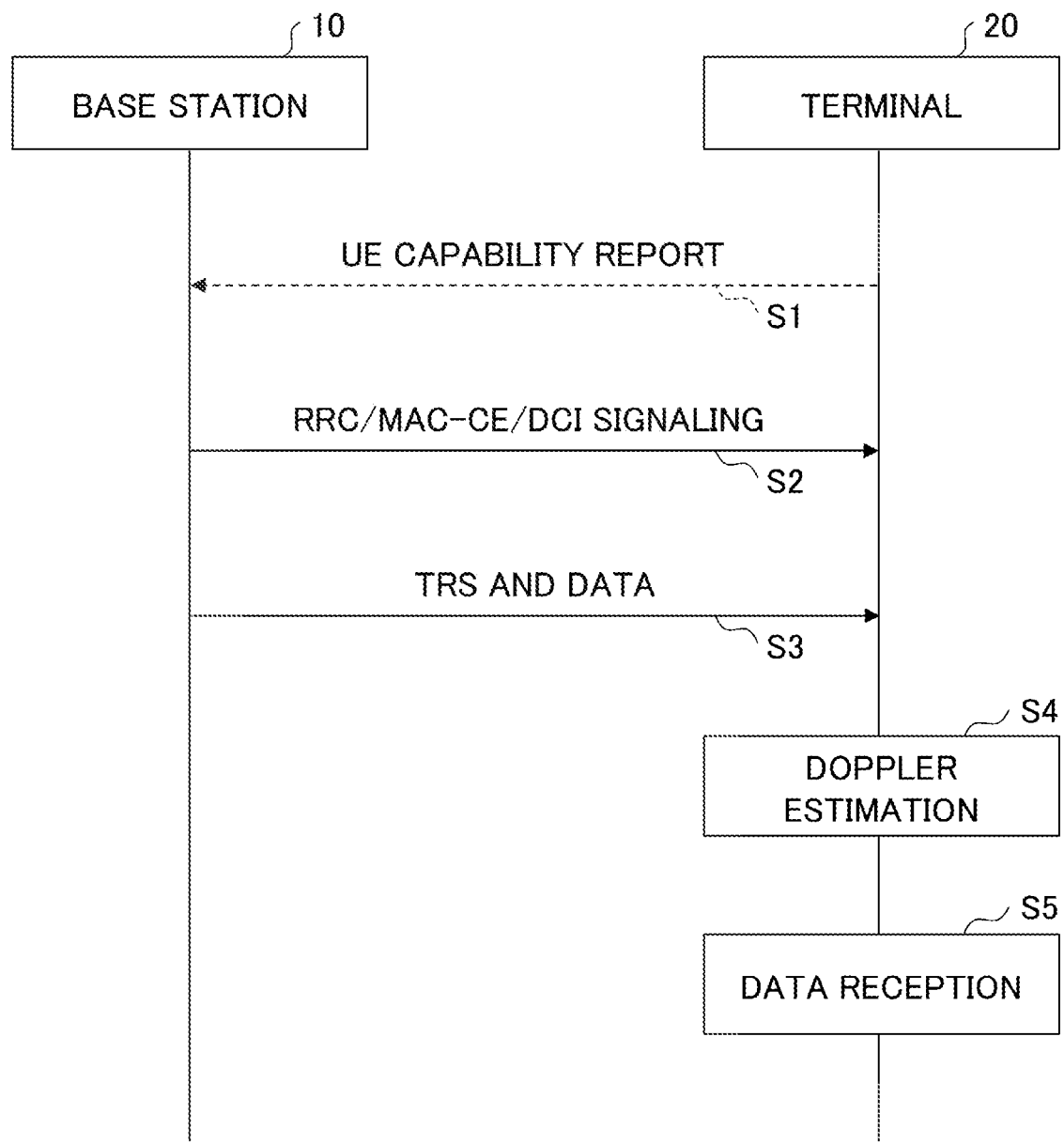
FIG. 12 is a sequence diagram showing an example of an operation according to an embodiment of the present invention.

FIG. 12 is a sequence diagram illustrating an example of an operation according to an embodiment of the present invention. In step S1, the terminal 20 may transmit to the base station 10, upon request from the base station 10, a UE capability report that includes: information indicating whether the terminal 20 supports the proposed TRS arrangement according to embodiments of the present invention; or a supporting condition. Step S1 may be performed, or need not be performed.

In step S2, the base station 10 may indicate, to the terminal 20, information about the arrangement of the TRS via RRC, MAC-CE, or DCI signaling. The information about the arrangement of the TRS may be transmitted to the terminal 20 again at any time after step S2.

In step S3, the base station 10 transmits TRSs and data to the terminal 20. Subsequently, the terminal 20 performs the Doppler estimation (S4) based on the received TRSs, and receives the data after performing correction based on the Doppler estimation (S5). Steps S3 to S5 may be repeated any number of times, or at any point during the repetition, the TRS arrangement may be indicated to the terminal 20 by the signaling of step S2, and the arrangement of TRSs to be transmitted may be dynamically changed.

In accordance with the above embodiment, the terminal 20 can perform a highly accurate Doppler estimation from low speed to high speed movement, by receiving reference signals that enable Doppler tracking. The terminal 20 may also receive dynamically changeable reference signals corresponding to a varying Doppler frequency to perform a highly accurate Doppler estimation in accordance with the moving speed.

That is, in a wireless communication system, reference signals suitable for Doppler estimation can be provided.

(Equipment Configuration)

Next, a functional configuration example of the base station 10 and the terminal 20 for performing the processes and operations described above will be described. The base station 10 and the terminal 20 include functions for implementing the embodiments described above. However, each of the base station 10 and the terminal 20 may include only part of the functions in the embodiment.

<Base Station 10>

Figure 13:
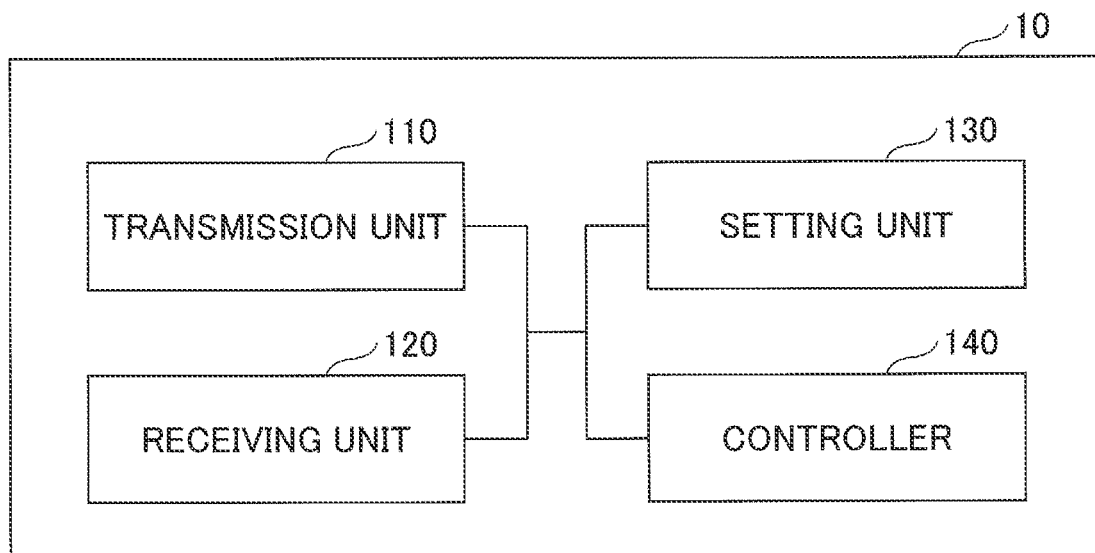
FIG. 13 is a diagram showing an example of a functional configuration of a base station 10 according to an embodiment of the present invention.

FIG. 13 is a diagram illustrating an example of the functional configuration of the base station 10 according to an embodiment of the present invention. As shown in FIG. 13, the base station 10 includes a transmission unit 110, a receiving unit 120, a setting unit 130, and a control unit 140. The functional configuration shown in FIG. 13 is only one example. If the operation according to the embodiments of the present invention can be performed, the functional category and the name of the functional unit may be any one.

The transmission unit 110 includes a function for generating a signal to be transmitted to the terminal 20 side and transmitting the signal wirelessly. The transmission unit 110 transmits a message between network nodes to the other network nodes. The receiving unit 120 includes a function for receiving various signals transmitted from the terminal 20 and acquiring, for example, information of a higher layer from the received signals. The transmission unit 110 has a function to transmit NR-PSS, NR-SSS, NR-PBCH, DL/UL control signals, or the like to the terminal 20. The receiving unit 120 receives a message between network nodes from other network nodes.

The setting unit 130 stores the preset setting information and various setting information to be transmitted to the terminal 20. The contents of the setting information are, for example, information relating to the setting of two-step random access and the like.

The control section 140 performs control of the two-step random access as described in the embodiment. A function unit related to signal transmission in the control unit 140 may be included in the transmission unit 110, and a function unit related to signal reception in the control unit 140 may be included in the receiving unit 120.

<Terminal 20>

Figure 14:
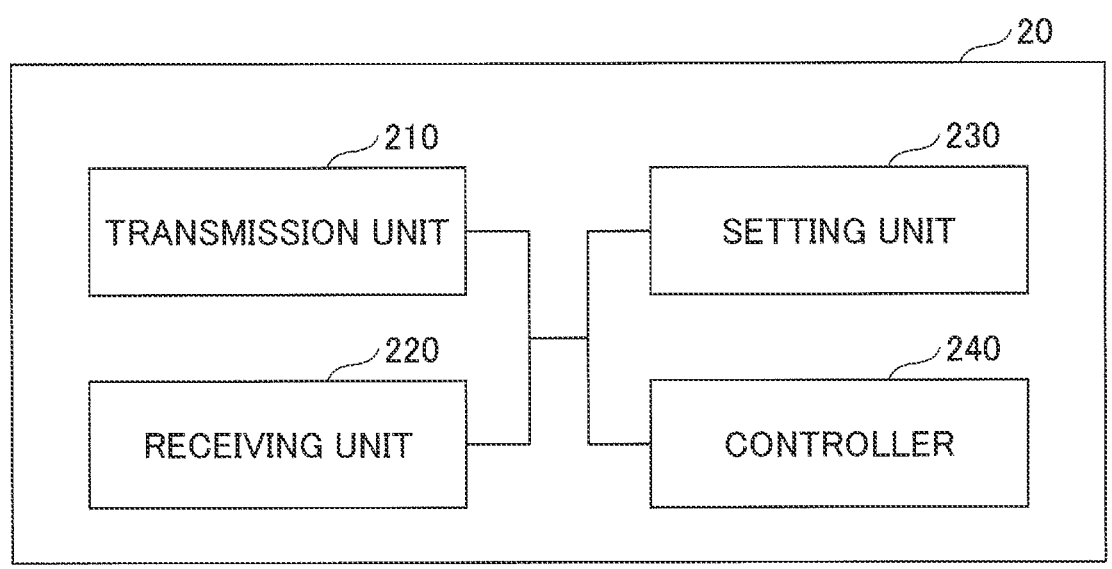
FIG. 14 is a diagram showing an example of a functional configuration of a terminal 20 according to an embodiment of the present invention.
Figure 15:
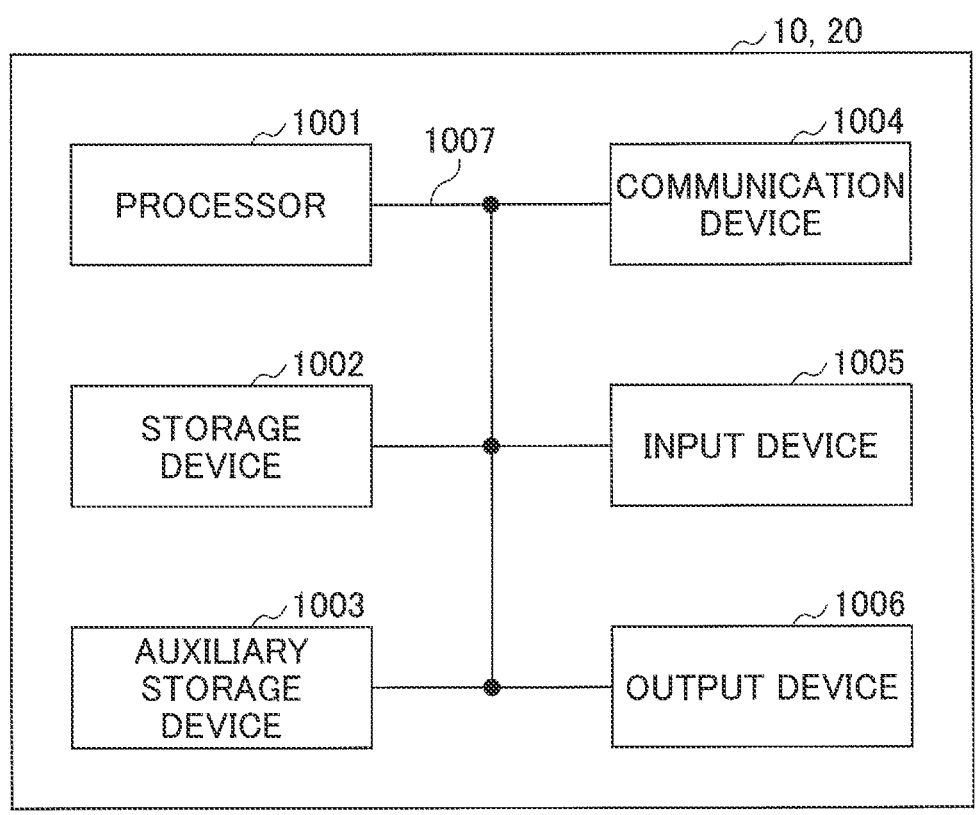
FIG. 15 is a diagram showing an example of a hardware configuration of a base station 10 or a terminal 20 according to an embodiment of the present invention.

FIG. 14 is a diagram illustrating an example of a functional configuration of a terminal 20 according to an embodiment of the present invention. As shown in FIG. 14, the terminal 20 includes a transmission unit 210, a receiving unit 220, a setting unit 230, and a control unit 240. The functional configuration shown in FIG. 14 is only one example. If the operation according to the embodiments of the present invention can be performed, the functional category and the name of the functional unit may be any one.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function of receiving NR-PSS, NR-SSS, NR-PBCH, DL/UL/SL control signals or the like transmitted from the base station 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to the other terminal 20 as D2D communication, and the receiving unit 220 receives PSCCH, PSSCH, PSDCH, PSBCH, and the like from another terminal 20.

The setting unit 230 stores various setting information received from the base station 10 by the receiving unit 220. The setting unit 230 also stores the preset setting information. The contents of the setting information are, for example, the setting of two-step random access and the like.

The controller 240 performs control of the two-step random access as described in the embodiment. A function unit related to signal transmission in the control unit 240 may be included in the transmission unit 210, and a function unit related to signal reception in the control unit 240 may be included in the receiving unit 220.

(Hardware Configuration)

Block diagrams (FIGS. 13 and 14) used in the description of the above embodiments show blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (for example, using wired, wireless, and the like) and implemented using these multiple devices. The functional block may be implemented by combining software with the device or the multiple devices.

Functions include, but are not limited to, judgment, decision, determination, calculation, computation, processing, derivation, research, search, verification, reception, transmission, output, access, resolution, option, selection, establishment, comparison, assumption, expectation, and deeming; broadcasting, notifying, communicating, forwarding, configuring, reconfiguring, allocating mapping, and assigning. For example, a functional block (component) that functions to transmit is referred to as a transmission unit or a transmitter. In either case, as described above, the implementation method is not particularly limited.

For example, the base station 10, terminal 20, and the like, according to an embodiment of the present disclosure may function as a computer for processing the radio communication method of the present disclosure. FIG. 10 is a diagram illustrating an example of the hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuits, devices, units, and the like. The hardware configuration of the base station 10 and terminal 20 may be configured to include one or more of the devices shown in the figure or may be configured without some of the devices.

The functions in the base station 10 and the terminal 20 are implemented by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be comprised of a central processing unit (CPU) including an interface with peripheral devices, a controller, an arithmetic unit, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the control unit 140 of the base station 10 shown in FIG. 13 may be stored in the storage device 1002 and implemented by a control program operating in the processor 1001. For example, the control unit 240 of the terminal 20 illustrated in FIG. 14 may be stored in the storage device 1002 and implemented by a control program operating in the processor 1001. Although the foregoing processes have been described and executed by one processor 1001, they may be executed simultaneously or sequentially by two or more processors 1001. The processor 1001 may be implemented by one or more chips. The program may be transmitted from the network via a telecommunication line.

The storage device 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main memory), or the like. The storage device 1002 can store programs (program codes), software modules, and the like, executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (for example, a compact disk, a digital versatile disk, a Blu-ray disk), a smart card, a flash memory (for example, a card, a stick, a key-drive), a floppy disk, a magnetic strip, and the like. The storage medium described above may be, for example, a database, a server, or other suitable medium that includes at least one of a storage device 1002 and an auxiliary storage device 1003.

The communication device 1004 is a hardware (transmitting/receiving device) for performing communication between computers via at least one of a wired network and a wireless network, and is also referred to as a network device, a network controller, a network card, a communication module, or the like. The communication device 1004 may comprise a high frequency switch, duplexer, filter, frequency synthesizer, or the like, for example, to implement at least one of a frequency division duplex and a time division duplex. For example, the transmitting/receiving antenna, the amplifier unit, the transceiving unit, the transmission line interface, and the like may be implemented by the communication device 1004. Transmitters and receptacles may be physically or logically isolated implementations of the transmitters and receivers.

An input device 1005 is an input device (for example, a keyboard, mouse, microphone, switch, button, sensor, and the like) that accepts external input. An output device 1006 is an output device (for example, a display, speaker, LED lamp, and the like) that implements an external output. The input device 1005 and the output device 1006 may have an integral configuration (for example, a touch panel).

Each device, such as the processor 1001 and the storage device 1002, is connected by a bus 1007 for communicating information. A bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array), and some or all of the functional blocks may be implemented by the hardware. For example, the processor 1001 may be implemented using at least one of these pieces of hardware.

Summary of Embodiments

As described above, according to an embodiment of the present invention, there is provided a terminal having a receiving unit configured to receive information relating to an arrangement of a tracking reference signal and a plurality of tracking reference signals based on the information relating to the arrangement of the tracking reference signal; and a controller configured to perform a Doppler estimation using two of the plurality of tracking reference signals, wherein an interval between the two of the plurality of tracking reference signals in a time domain is variable.

With the above configuration, the terminal 20 can pertain a highly accurate Doppler estimation from low speed to high speed movement by receiving reference signals that enable Doppler tracking. In addition, the terminal 20 may receive dynamically changeable reference signals corresponding to a varying Doppler frequency to perform a highly accurate Doppler estimation in accordance with the moving speed. That is, in a wireless communication system, reference signals suitable for Doppler estimation can be provided.

If a first tracking reference signal and a second tracking reference signal are disposed in a first slot and a third tracking reference signal and a fourth tracking reference signal are disposed in a second slot subsequent to the first slot, the interval between the second tracking reference signal and the third tracking reference signal in the time domain may be variable. With this arrangement, the terminal 20 can perform a highly accurate Doppler estimation from low speed to high speed movement by receiving reference signals that enable Doppler tracking.

A first tracking reference signal, a second tracking reference signal, and a third tracking reference signal may be disposed in the first slot, and the interval in the time domain between the first tracking reference signal and the second tracking reference signal, may be different from, the interval in the time domain between the second tracking reference signal and the third tracking reference signal. With this arrangement, the terminal 20 can perform a highly accurate Doppler estimation from low speed to high speed movement by receiving reference signals that enable Doppler tracking.

The information relating to the arrangement of the tracking reference signal may be dynamically changed by layer 1 signaling. With this arrangement, the terminal 20 can perform a highly accurate Doppler estimation according to the speed of movement by receiving dynamically changeable reference signals corresponding to a varying Doppler frequency.

The transmission unit that transmits information indicating capability to perform the Doppler estimation may be further provided. The above configuration allows the terminal 20 to report, to the base station, its capability to receive reference signals that enable Doppler tracking.

Embodiments of the present invention also provide a communication method in which a terminal performs: a reception procedure for receiving information relating to the arrangement of a tracking reference signal and a plurality of tracking reference signals based on the information relating to the arrangement of the tracking reference signal; and a control procedure for performing a Doppler estimation using two of the plurality of tracking reference signals, wherein the interval in the time domain between the two tracking reference signals is variable.

With the above configuration, the terminal 20 can perform a highly accurate Doppler estimation from low speed to high speed movement by receiving reference signals that enable Doppler tracking. The terminal 20 may also receive a dynamically changeable reference signals corresponding to varying Doppler frequency to perform a highly accurate Doppler estimation in accordance with the speed of movement. That is, in a wireless communication system, reference signals suitable for Doppler estimation can be provided.

Supplement to Embodiments

Thus, although embodiments of the present invention have been described, the disclosed invention is not limited to such embodiments, and various modifications, modifications, alternatives, substitutions and the like will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station 10 and terminal 20 have been described using a functional block diagram, but such devices may be implemented in hardware, software, or a combination thereof. Software operated by a processor of the base station 10 in accordance with embodiments of the present invention and software operated by a processor of the terminal 20 in accordance with embodiments of the present invention may be stored in random access memory (RAM), flash memory, read only memory (ROM), EPROM, EEPROM, register, hard disk (HDD), removable disk, CD-ROM, database, server, or any other suitable storage medium.

Information may be also communicated in other ways, as well as in the manner/embodiments described in this disclosure. For example, indication of information may be affected by physical layer signaling (for example, DCI (Downlink Control Information), UCI (Uplink Control Information), upper layer signaling (for example, RRC (Radio Resource Control) signaling, MAC (Medium Access Control) signaling, MIB (Master Information Block), SIB (System Information Block), other signals, or a combination thereof. The RRC signaling may be referred to as an RRC message, and may be, for example, an RRC Connection Setup message, an RRC Connection Reconfiguration message, and the like.

Each aspect/embodiment described in this disclosure is as follows: LTE (Long Term Evolution), LTE-A (LIE-Advanced), SUPER 3G, MT-Advanced, 4G (4th generation mobile communication system), 5G (5th generation mobile communication system), FRA (Future Radio Access), NR (new Radio), W-CDMA (registered trademark), GSM (registered trademark), CDMA2000 UMB (Ultra Mobile Broadband), IEEE 802.11 (Wi-Fi), IEEE 802.16 (WiMAX), IEEE 802.20 (Ultra-WideBand), Bluetooth (Registered), It may be applied to at least one of the systems utilizing other appropriate systems and the next generation systems extended thereon. Multiple systems may also be applied in combination (e.g., at least one of LTE and LTE-A combined with 5G, and the like).

The processing procedures, sequences, flowcharts, etc. of each aspect/embodiment described herein may be reordered unless there is any conflict. For example, the methods described in the present disclosure are presented using exemplary sequences to present elements of the various steps and are not limited to the particular order presented.

The specific operations described herein as performed by the base station 10 may be performed by its upper node in some cases. In a network of one or more network nodes having a base station 10, it will be apparent that various operations performed for communication with terminal 20 may be performed by at least one of the base station 10 and other network nodes other than base station 10 (for example, but not limited to MME, S-GW, and the like). Although the above illustrates that there is only one other network node other than the base station 10, the other network nodes may be a combination of multiple other network nodes (for example, MME and S-GW).

The information or signals described in this disclosure can be output from a higher layer (or lower layer) to a lower layer (or higher layer). It may be input and output through multiple network nodes.

Input and output information may be stored in a specific location (for example, memory) or managed using management tables. The input and output information may be overwritten, updated, or added. The output information may be deleted. The input information or the like may be transmitted to another device.

The determination in this disclosure may be made by a value (0 or 1) expressed in 1 bit, by a true or false value (Boolean: true or false), or by a numerical comparison (for example, a comparison with a predetermined value).

Software should be broadly interpreted to mean, whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared, microwave, and the like), at least one of these wireline technology and wireless technology is included within the definition of a transmission medium.

The information, signals and the like described in this disclosure may be represented using any of a variety of different techniques. For example, data, instructions, commands, information, signals, bits, symbols, chips, and the like, which may be referred to throughout the above description, may be represented by voltages, currents, electromagnetic waves, magnetic fields or magnetic particles, optical fields or photons, or any combination thereof.

The terms described in this disclosure and those necessary for understanding this disclosure may be replaced by tams having the same or similar meanings. For example, at least one of the channels and the symbols may be a signal (signaling). The signal may also be a message. The component carrier may also be referred to as a carrier frequency, cell, frequency carrier, or the like.

As used in this disclosure, the terms "system" and "network" are used interchangeably.

The information, parameters, and the like described in the present disclosure may also be expressed using absolute values, relative values from predetermined values, or they may be expressed using corresponding separate information. For example, the wireless resources may be those indicated by an index.

The name used for the parameters described above is not restrictive in any respect. In addition, the mathematical equations using these parameters may differ from those explicitly disclosed in this disclosure. Because the various channels (for example, PUCCH, PDCCH, and the like) and information elements can be identified by any suitable name, the various names assigned to these various channels and information elements are not limited names in any respect.

In this disclosure, the tams "Base Station", "Wireless Communication Base Station", "Base Station Device", "Fixed Station", "NodeB", "eNodeB", "gNodeB", "Access Point", "Transmission Point", "Receiving Point", "Transmission/Reception Point", "Cell", "Sector", "Cell Group", "Carrier", "Component Carrier" and the like may be used interchangeably, and may be referred to in tams such as macrocells, small cells, femtocells, picocells and the like.

The base station can accommodate one or more (for example, three) cells. Where the base station accommodates a plurality of cells, the entire coverage area of the base station can be divided into a plurality of smaller areas, each smaller area can also provide communication services by means of a base station subsystem (for example, an indoor small base station (RRH) or a remote Radio Head), and the term "cell" or "sector" refers to a portion or all of the coverage area of at least one of the base station and base station subsystem that provides communication services at the coverage.

In this disclosure, terms such as "mobile station", "user terminal", "user equipment", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base stations and the mobile station may be referred to as a transmitter, receiver, communication device, or the like. At least one of the base station and the mobile station may be a device mounted on the mobile body, a mobile body, or the like. The mobile may be a vehicle (for example, a car, an airplane, and the like), an unmanned mobile (for example, a drone, an automated vehicle, and the like), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read by the user terminal. For example, various aspects/embodiments of the present disclosure may be applied for a configuration in which communication between base stations and user terminals is replaced by communication between multiple terminals 20 (for example, may be referred to as D2D (Device-to-Device), V2X (Vehicle-to-Everything), etc.). In this case, the terminal 20 may have the functions provided by the base station 10 described above. The phrases "upstream" and "downstream" may also be replaced by the phrases corresponding to terminal-to-terminal communication (for example, "side"). For example, an upstream channel, a downstream channel, or the like may be read by a side channel.

Similarly, the user terminal in the present disclosure may be read by the base station. In this case, the base station may have the functions provided by the user terminal described above.

As used in this disclosure, the terms "determination (determining)" and "decision (determining)" may encompass a wide variety of operations. "Judgment" includes, for example, judging, calculating, computing, processing, deriving, investigating, looking up, searching, investigating (for example, searching in tables, databases, or other data structures), ascertaining, and so forth. "Judgment" and "decision" may also include receiving (for example, receiving information), transmitting (for example, sending information), input, output, and accessing (for example, accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination." "Decision" may be read as "Assuming," "Expected," or "Considering," and the like.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "solely" unless otherwise specified. In other words, the expression "based on" means both "solely" and "at least based on".

Any reference to an element using a designation such as "first" or "second" as used in the present disclosure does not generally limit the amount or order of those elements. These designations can be used in the present disclosure as a convenient way to distinguish between two or more elements. Thus, references to the first and second elements do not imply that only two elements may be employed or that the first element must in some way precede the second element.

"Means" in the configuration of each of the above devices may be replaced by "parts," "circuits," "devices," and the like.

When the terms "include", "including" and variations thereof are used in the present disclosure, these terms are intended to be comprehensive as well as the term "comprising". Moreover, the term "or" as used in this disclosure is not intended to be an exclusive-OR.

The wireless frame may consist of one or more frames in the time domain. Each frame or frames in the time domain may be referred to as subframes. The subframe may further comprise one or more slots in the time domain. The subframe may be a fixed length of time (for example, 1 ms) independent of the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, wireless frame configuration, certain filtering processing performed by the transceiver in the frequency domain, and specific windowing processing performed by the transceiver in the time domain.

The slot may consist of one or more symbols in the time domain, such as OFDM (Orthogonal Frequency Division Multiplexing) symbols, SC-FDMA (Single Carrier Frequency Division Multiple Access symbols, and the like. The slot may be in time units based on a numerology.

The slots may include a plurality of minislots. Each minislot may be comprised of one or more symbols in the time domain. The minislot may also be referred to as a subslot. The minislots may consist of fewer symbols than the slots. A PDSCH (or PUSCH) transmitted in time units greater than a minislot may be called a PDSCH (or PUSCH)

mapping type A. PDSCH (or PUSCH) transmitted using minislots may be referred to as PDSCH (or PUSCH) mapping type B.

Radio frames, subframes, slots, minislots and symbols all represent time units for transmitting signals. Radio frames, subframes, slots, minislots and symbols, respectively, may be designated separately.

For example, one subframe may be referred to as a Transmission Time Interval (TTI), multiple consecutive subframes may be referred to as a TTI, and one slot or one minislot may be referred to as a TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a minislot, or the like, rather than a subframe.

The TTI refers, for example, to the minimum time unit for scheduling in wireless communication. For example, in an LTE system, a base station schedules each terminal 20 to allocate wireless resources (such as frequency bandwidth, transmit power, and the like that can be used in each terminal 20) in TTI units. The definition of TTI is not limited to this.

The TTI may be a transmission time unit, such as a channel-encoded data packet (transport block), code block, codeword, or the like, or may be a processing unit, such as a scheduling or link adaptation. When a TTI is provided, the time interval (e.g., the number of symbols) during which the transport block, code block, codeword, or the like is actually mapped may be shorter than the TTI.

If one slot or one minislot is referred to as a TTI, one or more TTIs (that is, one or more slots or one or more minislots) may be the minimum time unit for scheduling. The number of slots (minislots) constituting the minimum time unit of the scheduling may also be controlled.

A TTI having a time length of 1 ms may be referred to as a TTI (usually a TTI in LTE Rel. 8-12), a normal TTI, a long TTI, a normal subframe, a normal subframe, a long subframe, a slot, and the like. A TTI that is typically shorter than a TTI may be referred to as a shortened TTI, a short TTI, a partial TTI (partial or fractional TTI), a shortened subframe, a short subframe, a minislot, a subslot, a slot, or the like.

The long TTI (for example, usually TTI, subframe, and the like) may be interpreted as a TTI having a time length exceeding 1 ms, and the short TTI (for example, shortened TTI, and the like) may be interpreted as a TTI having a TTI length less than the TTI length of the long TTI and a TTI length greater than 1 ms.

Resource blocks (RBs) are time domain and frequency domain resource allocation units and may include one or more consecutive subcarriers in the frequency domain. The number of subcarriers included in the RB may be the same, regardless of the numerology, for example 12. The number of subcarriers included in the RB may be determined on the basis of numerology.

The time domain of the RB may also include one or more symbols, which may be 1 slot, 1 minislot, 1 subframe, or 1 TTI in length. One TTI, one subframe, and the like, may each consist of one or more resource blocks.

Note that one or more RBs may be referred to as physical resource blocks (PRBs), sub-carrier groups (SCGs), resource element groups (REGs), PRB pairs, RB pairs, and the like.

Resource blocks may also consist of one or more resource elements (RE). For example, 1 RE may be a wireless resource area of one sub-carrier and one symbol.

The bandwidth portion (which may also be referred to as a partial bandwidth, and the like) may represent a subset of consecutive common RB (common resource blocks) for a given numerology in a carrier. Here, the common RB may be identified by an index of RB relative to the common reference point of the carrier. A PRB is defined in a BWP and may be numbered within that BWP.

BWP may include BWP for UL (UL BWP) and BWP for DL (DL BWP). For a UE, one or more BWPs may be configured in one carrier.

At least one of the configured BWPs may be active, and the UE need not assume that it will send and receive predetermined signals/channels outside of the active BWP. The terms "cell" and "carrier" in this disclosure may be replaced by "BWP."

Structures such as radio frames, subframes, slots, minislots, and symbols described above are exemplary only. For example, the number of subframes included in a wireless frame, the number of slots per subframe or wireless frame, the number of minislots included in the slot, the number of symbols and RBs included in the slot or minislot, the number of subcarriers included in the RB, the number of symbols in the TTI, the symbol length, the length of the cyclic prefix (CP) length, and the like may vary.

In the present disclosure, where an article is added by translation, for example a, an, and the English language, the disclosure may include that the noun following these articles is plural.

In this disclosure, the term "A and B are different" may mean "A and B are different from each other." Incidentally, the term may mean "A and B are different from C." Terms such as "separated" or "combined" may be interpreted as well as "different".

The aspects/embodiments described in this disclosure may be used alone, in combination, or switched with implementation. Notice of a given information (for example, "X" notice) may also be given by implication (for example, "no notice of the given information"), not explicitly.

In the present disclosure, TRS is an example of a tracking reference signal. DCI is an example of Layer 1 signaling.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

DESCRIPTION OF THE REFERENCE NUMERALS 10 base station
110 transmission unit
120 receiving unit
130 setting unit
140 control unit
20 terminal
210 transmission unit
220 receiving unit
230 setting unit
240 controller
1001 processor
1002 storage device
1003 auxiliary storage device
1004 communication device
1005 input device
1006 output device

The invention claimed is:

1. A terminal, comprising:
   a receiver configured to receive information relating to an arrangement of a tracking reference signal and a plurality of tracking reference signals based on the information relating to the arrangement of the tracking reference signal; and
   a controller configured to perform a Doppler estimation using two of the plurality of tracking reference signals, wherein an interval between the two of the plurality of tracking reference signals in a time domain is variable,
   wherein a first tracking reference signal, a second tracking reference signal, and a third tracking reference signal are arranged in a first slot, and
   wherein an interval in a time domain between the first tracking reference signal and the second tracking reference signal differs from an interval in a time domain between the second tracking reference signal and the third tracking reference signal.

2. The terminal as claimed in claim 1, wherein when a first tracking reference signal and a second tracking reference signal are arranged in a first slot and a third tracking reference signal and a fourth tracking reference signal are arranged in a second slot subsequent to the first slot, an interval between the second tracking reference signal and the third tracking reference signal in a time domain is variable.

3. The terminal as claimed in claim 1, wherein the information about the arrangement of the tracking reference signal is dynamically changed by layer 1 signaling.

4. The terminal as claimed in claim 1, further comprising:
   a transmission unit configured to transmit information indicating a capability to perform a Doppler estimation.

5. A communication method performed by a terminal, comprising:
   receiving information relating to an arrangement of a tracking reference signal and a plurality of tracking reference signals based on the information; and
   performing a Doppler estimation using two of the plurality of tracking reference signals, wherein an interval between the two of the plurality of tracking reference signals is variable in a time domain,
   wherein a first tracking reference signal, a second tracking reference signal, and a third tracking reference signal are arranged in a first slot, and
   wherein an interval in a time domain between the first tracking reference signal and the second tracking reference signal differs from an interval in a time domain between the second tracking reference signal and the third tracking reference signal.

* * * * *